US012245710B2

(12) United States Patent
Papé

(10) Patent No.: US 12,245,710 B2
(45) Date of Patent: Mar. 11, 2025

(54) METHODS FOR MAKING A CONTAINER, AND RELATED SYSTEMS (71) Applicant: MIIR Holdings, LLC, Seattle, WA (US)

(72) Inventor: Bryan Papé, Seattle, WA (US)

(73) Assignee: MIIR Holdings, LLC, Seattle, WA (US)

( * ) Notice: Subject to any disclaimer, the term of this patent is extended or adjusted under 35 U.S.C. 154(b) by 433 days.

(21) Appl. No.: 17/369,662

(22) PCT Filed: Jan. 4, 2021

(86) PCT No.: PCT/US2021/012074
§ 371 (c)(1),
(2) Date: Mar. 23, 2023

(87) PCT Pub. No.: WO2021/138669
PCT Pub. Date: Jul. 8, 2021

(65) Prior Publication Data
US 2023/0233008 A1 Jul. 27, 2023

Related U.S. Application Data (60) Provisional application No. 62/956,781, filed on Jan. 3, 2020.

(51) Int. Cl.
A47G 19/22 (2006.01)
A47J 41/02 (2006.01)
(Continued)

(52) U.S. Cl.
CPC ........ *A47G 19/2288* (2013.01); *A47J 41/024* (2013.01); *A47J 41/028* (2013.01);
(Continued)

(58) Field of Classification Search
CPC .................. B65D 81/3869; B65D 81/3881
See application file for complete search history.

(56) References Cited

U.S. PATENT DOCUMENTS

| 81,817 A | 9/1868 | Nuellens |
| D30,308 S | 3/1899 | Williams |

(Continued)

FOREIGN PATENT DOCUMENTS

| CN | 300990171 | 8/2009 |
| CN | 102802462 | 11/2012 |

(Continued)

OTHER PUBLICATIONS

English Translation of Hiroshi JP 2000-116541 A. (Year: 2000).*

(Continued)

*Primary Examiner* — Jason L Vaughan
(74) *Attorney, Agent, or Firm* — Janeway Patent Law PLLC; John Janeway (57) ABSTRACT A method for making a container includes forming a first cavity of a container by shaping an inner wall so that a first surface of the inner wall defines the first cavity; forming a second cavity of the container by shaping an outer wall so that a third surface of the outer wall surrounds a second surface of the inner wall such that together the third and second surfaces define the second cavity; and connecting the inner and outer walls together. The method then includes forming a hole through the outer wall to expose the second cavity to the outside ambient environment and then applying an enamel coating, while preventing the enamel coating from being deposited in the hole. After the enamel coating is applied, the method includes heating the container to glaze the enamel coating and fix the coating to the one or more surfaces.

10 Claims, 3 Drawing Sheets (51) Int. Cl.
  *B23P 15/00* (2006.01)
  *B65D 25/14* (2006.01)
  *B65D 25/28* (2006.01)
  *B65D 25/34* (2006.01)
  *B65D 81/38* (2006.01)
  *C23D 5/02* (2006.01)

(52) U.S. Cl.
  CPC .............. *B23P 15/00* (2013.01); *B65D 25/14* (2013.01); *B65D 25/2811* (2013.01); *B65D 25/34* (2013.01); *B65D 81/3869* (2013.01); *C23D 5/02* (2013.01); *B23P 2700/05* (2013.01)

(56) References Cited

U.S. PATENT DOCUMENTS

| | | | |
|---|---|---|---|
| 1,165,952 | A | 12/1915 | Dunlap |
| 1,689,062 | A | 10/1928 | Titchener |
| 1,964,151 | A | 6/1934 | Guntrup |
| 2,215,691 | A | 9/1940 | East |
| 2,414,901 | A | 1/1947 | Schlumbohm |
| 2,601,573 | A | 6/1952 | Ernest |
| 2,681,154 | A | 6/1954 | Schlumbohm |
| 2,705,086 | A | 3/1955 | Schlumbohm |
| 2,889,065 | A | 6/1959 | Lawlor |
| D199,320 | S | 10/1964 | Swett |
| 3,194,468 | A | 7/1965 | Baron |
| D202,643 | S | 10/1965 | Hoyt |
| 3,327,881 | A | 6/1967 | Maier |
| 3,344,734 | A | 10/1967 | Aguirre-Batres |
| 3,443,715 | A | 5/1969 | Edwards |
| 3,465,905 | A | 9/1969 | Schottanes |
| 3,536,496 | A | 10/1970 | Paoloni |
| 3,591,768 | A | 7/1971 | Torres |
| 3,603,106 | A | 9/1971 | Ryan |
| 3,730,383 | A | 5/1973 | Dunn |
| 3,739,932 | A | 6/1973 | Westover |
| 3,800,954 | A | 4/1974 | Lampcov |
| 3,938,690 | A | 2/1976 | Butler |
| 4,033,248 | A | 7/1977 | DiSalino |
| 4,057,167 | A | 11/1977 | Lee |
| D248,358 | S | 7/1978 | Thomas |
| 4,150,608 | A | 4/1979 | Hirschberg |
| D265,462 | S | 7/1982 | Andrulionis |
| 4,362,623 | A | 12/1982 | Holopainen |
| D274,115 | S | 6/1984 | Gavin |
| D274,502 | S | 7/1984 | Little |
| 4,488,660 | A | 12/1984 | Murakami |
| D278,121 | S | 3/1985 | Sussman |
| D279,346 | S | 6/1985 | Ruxton |
| D279,948 | S | 8/1985 | Weernink |
| D282,616 | S | 2/1986 | Gallagher |
| D287,325 | S | 12/1986 | Schmidt |
| D289,143 | S | 4/1987 | Guillaume |
| D289,592 | S | 5/1987 | Loughridge |
| D290,325 | S | 6/1987 | Ritman |
| 4,704,954 | A | 11/1987 | Mollenhoff |
| 4,715,271 | A | 12/1987 | Kitagawa |
| 4,746,028 | A | 5/1988 | Bagg |
| 4,856,174 | A | 8/1989 | Ishizaki et al. |
| 4,863,601 | A | 9/1989 | Wittekind |
| D306,970 | S | 4/1990 | Bauer-Secundus |
| 4,997,124 | A | 3/1991 | Kitabatake et al. |
| D316,013 | S | 4/1991 | Jones |
| D316,206 | S | 4/1991 | Daenen |
| D323,758 | S | 2/1992 | Hoelterscheidt |
| D325,848 | S | 5/1992 | Embree |
| 5,132,124 | A | 7/1992 | Tamaki |
| D329,198 | S | 9/1992 | Krupa |
| 5,168,140 | A | 12/1992 | Welker |
| 5,190,643 | A | 3/1993 | Duncan |
| 5,226,585 | A | 7/1993 | Varano |
| 5,267,685 | A | 12/1993 | Sorensen |
| 5,296,081 | A | 3/1994 | Morin |
| D346,092 | S | 4/1994 | Van De Velde |
| 5,318,786 | A | 6/1994 | Clarkson |
| D350,457 | S | 9/1994 | Bailey |
| D351,321 | S | 10/1994 | Steppe, Sr. |
| D353,973 | S | 1/1995 | Adado |
| D356,004 | S | 3/1995 | VanValkenburg |
| 5,407,270 | A | 4/1995 | Barile |
| 5,415,339 | A | 5/1995 | Howard |
| 5,434,392 | A | 7/1995 | Belinkoff |
| D363,001 | S | 10/1995 | Scholfield |
| D363,858 | S | 11/1995 | Sweeney |
| D365,721 | S | 1/1996 | Huang |
| D366,186 | S | 1/1996 | Kato |
| D367,201 | S | 2/1996 | Joergensen |
| 5,509,583 | A | 4/1996 | Dolson |
| D372,398 | S | 8/1996 | Lamson |
| 5,542,599 | A | 8/1996 | Sobol |
| 5,564,583 | A | 10/1996 | Kelley |
| D375,871 | S | 11/1996 | Jarvis |
| 5,588,197 | A | 12/1996 | Satomi et al. |
| D377,293 | S | 1/1997 | Husted |
| 5,605,710 | A | 2/1997 | Pridonoff |
| D379,732 | S | 6/1997 | Jeppesen |
| D383,351 | S | 9/1997 | DeMore |
| D389,006 | S | 1/1998 | DeMore |
| 5,709,314 | A | 1/1998 | Petry |
| 5,769,262 | A | 6/1998 | Yamada |
| 5,771,777 | A | 6/1998 | Davis |
| D395,794 | S | 7/1998 | Moran |
| D396,380 | S | 7/1998 | Lai |
| 5,775,206 | A | 7/1998 | St-Gelais |
| D398,852 | S | 9/1998 | Gross |
| 5,842,408 | A | 12/1998 | Hatta |
| 5,884,796 | A | 3/1999 | Hallmark |
| D409,051 | S | 5/1999 | Huang |
| D412,806 | S | 8/1999 | Pierce |
| 5,947,004 | A | 9/1999 | Huang |
| D414,685 | S | 10/1999 | Chahed |
| D415,651 | S | 10/1999 | Trombly |
| D415,652 | S | 10/1999 | Loew |
| D416,755 | S | 11/1999 | Trombly |
| D417,127 | S | 11/1999 | Steadward |
| D417,817 | S | 12/1999 | Loew |
| D423,877 | S | 5/2000 | Kerr |
| D427,017 | S | 6/2000 | Reimer |
| D427,853 | S | 7/2000 | Kohlhase |
| D429,118 | S | 8/2000 | Hurlbut |
| D430,449 | S | 9/2000 | Yeh |
| D432,865 | S | 10/2000 | Cohen |
| D436,804 | S | 1/2001 | Wolfe |
| D438,298 | S | 2/2001 | McNutt |
| D438,376 | S | 3/2001 | Marshall |
| D440,459 | S | 4/2001 | Durbin |
| D448,602 | S | 10/2001 | Bodum |
| D455,047 | S | 4/2002 | Wolfe |
| D457,395 | S | 5/2002 | Gluck |
| D458,082 | S | 6/2002 | Gluck |
| RE37,773 | E | 7/2002 | Trombley |
| 6,425,317 | B1 | 7/2002 | Simmons |
| D462,575 | S | 9/2002 | Gluck |
| D462,576 | S | 9/2002 | Janky |
| D463,715 | S | 10/2002 | Dretzka |
| D465,132 | S | 11/2002 | Janky |
| D466,814 | S | 12/2002 | Hurlburt |
| D471,763 | S | 3/2003 | Hurlbut |
| D471,767 | S | 3/2003 | Ucar Cortes |
| D475,891 | S | 6/2003 | Bin |
| D476,528 | S | 7/2003 | Janky |
| D477,185 | S | 7/2003 | Janky |
| D478,287 | S | 8/2003 | Corker |
| D481,590 | S | 11/2003 | Lin |
| D481,591 | S | 11/2003 | Lin |
| D482,238 | S | 11/2003 | Lin |
| D483,676 | S | 12/2003 | Lee |
| D483,876 | S | 12/2003 | Walasek |
| D488,029 | S | 4/2004 | Bodum |
| D488,672 | S | 4/2004 | Oas |
| D488,673 | S | 4/2004 | Farce |
| D489,573 | S | 5/2004 | Li |

(56) References Cited

U.S. PATENT DOCUMENTS

| | | |
|---|---|---|
| D490,274 S | 5/2004 | Irvine |
| 6,752,287 B1 | 6/2004 | Lin |
| D494,815 S | 8/2004 | Bodum |
| D495,186 S | 8/2004 | Poupel |
| D496,559 S | 9/2004 | Bodum |
| D498,638 S | 11/2004 | Morrison |
| 6,824,003 B1 | 11/2004 | Wong |
| D504,796 S | 5/2005 | Schuler |
| D514,458 S | 2/2006 | Lawson |
| D516,364 S | 3/2006 | Davies |
| D519,320 S | 4/2006 | Festa |
| D522,312 S | 6/2006 | Bodum |
| D522,796 S | 6/2006 | Teh-Hsiung |
| D523,692 S | 6/2006 | Meehan |
| D523,693 S | 6/2006 | Bodum |
| D527,222 S | 8/2006 | Liu |
| D527,576 S | 9/2006 | Gluck |
| 7,104,413 B2 * | 9/2006 | Liu .................. A47J 41/0055 215/12.1 |
| D530,153 S | 10/2006 | Karp |
| D530,607 S | 10/2006 | Cornet |
| D531,033 S | 10/2006 | Schmidtner |
| D531,451 S | 11/2006 | Bin |
| D533,402 S | 12/2006 | Bin |
| D533,747 S | 12/2006 | Jin |
| D533,779 S | 12/2006 | Schmidtner |
| D534,396 S | 1/2007 | Kramer |
| D536,213 S | 2/2007 | Schuler |
| D536,214 S | 2/2007 | Schuler |
| 7,172,101 B2 | 2/2007 | Find |
| D539,608 S | 4/2007 | Lapsker |
| D539,609 S | 4/2007 | Ying |
| D541,105 S | 4/2007 | Jin |
| D545,128 S | 6/2007 | Liu |
| D549,522 S | 8/2007 | Tien |
| 7,275,653 B2 | 10/2007 | Tedford, Jr. |
| D560,951 S | 2/2008 | Appleton |
| D561,594 S | 2/2008 | Condon |
| D562,072 S | 2/2008 | Wahl |
| D563,173 S | 3/2008 | Karam |
| D564,883 S | 3/2008 | Rica |
| D565,798 S | 4/2008 | Ivanova |
| D567,026 S | 4/2008 | Karam |
| D567,102 S | 4/2008 | Rhoden |
| D568,106 S | 5/2008 | Karam |
| D569,190 S | 5/2008 | Karam |
| H2217 H | 6/2008 | Smay |
| D571,152 S | 6/2008 | Tien |
| D572,083 S | 7/2008 | Tien |
| D572,975 S | 7/2008 | Germany |
| D573,017 S | 7/2008 | Henderson |
| D573,390 S | 7/2008 | Ablo |
| D573,394 S | 7/2008 | Tullney |
| D575,110 S | 8/2008 | Karam |
| D582,206 S | 12/2008 | Fuller |
| D583,191 S | 12/2008 | Wong |
| D584,912 S | 1/2009 | Green |
| D586,606 S | 2/2009 | Ma |
| D589,747 S | 4/2009 | Wong |
| D589,751 S | 4/2009 | Liu |
| D591,103 S | 4/2009 | Wong |
| 7,513,380 B2 | 4/2009 | Canedo |
| D602,730 S | 10/2009 | Kino |
| D609,571 S | 2/2010 | Butler |
| D614,918 S | 5/2010 | Chisholm |
| D614,955 S | 5/2010 | Cresswell |
| D614,961 S | 5/2010 | Thomas |
| D617,608 S | 6/2010 | Yang |
| D618,508 S | 6/2010 | George |
| D621,220 S | 8/2010 | Lown |
| D621,648 S | 8/2010 | Lown |
| D621,659 S | 8/2010 | Liu |
| D622,090 S | 8/2010 | Bodum |
| D622,360 S | 8/2010 | Bouroullec |
| D623,896 S | 9/2010 | Wahl |
| D623,949 S | 9/2010 | Throndsen |
| D624,356 S | 9/2010 | Davies |
| D625,541 S | 10/2010 | Kauer |
| D627,602 S | 11/2010 | Eyal |
| D628,486 S | 12/2010 | Lane |
| D632,522 S | 2/2011 | Wahl |
| D635,401 S | 4/2011 | DelVecchio |
| D636,627 S | 4/2011 | Harris |
| 7,918,364 B2 | 4/2011 | Kim |
| D639,177 S | 6/2011 | Pape |
| D639,608 S | 6/2011 | Tohm, Sr. |
| D640,346 S | 6/2011 | Sheppard |
| D644,062 S | 8/2011 | Lorenz |
| D649,037 S | 11/2011 | Cimmerer |
| D650,633 S | 12/2011 | Birgers |
| D652,255 S | 1/2012 | Carland |
| D653,079 S | 1/2012 | King |
| D654,869 S | 2/2012 | Konz |
| D655,167 S | 3/2012 | Weber-Trinkfass |
| D656,361 S | 3/2012 | Gilbert |
| D658,878 S | 5/2012 | Deguglimo |
| D659,007 S | 5/2012 | Pape |
| D661,939 S | 6/2012 | Kern |
| D663,155 S | 7/2012 | Bodum |
| D664,001 S | 7/2012 | Liu |
| D668,094 S | 10/2012 | Broen |
| D668,913 S | 10/2012 | Mayer |
| 8,336,732 B1 | 12/2012 | Tobias |
| D675,100 S | 1/2013 | Herbst |
| D677,360 S | 3/2013 | Sheppard |
| D678,068 S | 3/2013 | Huang |
| D679,188 S | 4/2013 | Zuchetta |
| D679,942 S | 4/2013 | Lyall, III |
| D679,949 S | 4/2013 | Meritt |
| D679,979 S | 4/2013 | Ramsland |
| D680,435 S | 4/2013 | Wanet |
| D681,448 S | 5/2013 | O'Malley |
| D684,312 S | 6/2013 | Badawi |
| D684,805 S | 6/2013 | Bjerre-Poulsen |
| D695,138 S | 12/2013 | Ball |
| D700,802 S | 3/2014 | Miller |
| D701,079 S | 3/2014 | Arora |
| D702,506 S | 4/2014 | Mettler |
| 8,690,006 B1 | 4/2014 | Chiorazzi |
| 8,746,131 B2 | 6/2014 | Saitoh |
| D708,954 S | 7/2014 | Barnes |
| D709,328 S | 7/2014 | Ross |
| D717,109 S | 11/2014 | Simontov |
| D717,115 S | 11/2014 | Lane |
| D718,577 S | 12/2014 | Gonzales |
| D721,251 S | 1/2015 | Stamper |
| D722,476 S | 2/2015 | Kilduff |
| D722,830 S | 2/2015 | Miller |
| 8,960,528 B2 | 2/2015 | Sadlier |
| D724,896 S | 3/2015 | Williams |
| D728,313 S | 5/2015 | Bo |
| D728,314 S | 5/2015 | Carstensen |
| D731,240 S | 6/2015 | Bell |
| D731,241 S | 6/2015 | Yessin |
| D731,251 S | 6/2015 | Lane |
| D734,206 S | 7/2015 | Thuma |
| D735,528 S | 8/2015 | Hubert |
| D740,029 S | 10/2015 | Otto |
| D740,073 S | 10/2015 | Zorovich |
| D740,612 S | 10/2015 | Crosby |
| D742,173 S | 11/2015 | Perman |
| D743,269 S | 11/2015 | Pape |
| D744,280 S | 12/2015 | Chiang |
| D746,701 S | 1/2016 | Pape |
| D747,626 S | 1/2016 | Morris, II |
| D750,437 S | 3/2016 | Katterheinrich |
| D750,934 S | 3/2016 | Kemker |
| D751,331 S | 3/2016 | Rashid |
| D752,397 S | 3/2016 | Seiders |
| D756,712 S | 5/2016 | Kushner |
| D757,542 S | 5/2016 | Prum |
| D758,793 S | 6/2016 | Ho |
| D758,859 S | 6/2016 | Sorensen |
| D760,586 S | 7/2016 | Seiders |

(56) References Cited

U.S. PATENT DOCUMENTS

| | | |
|---|---|---|
| D761,054 S | 7/2016 | Simontov |
| D763,622 S | 8/2016 | Shirley |
| D764,870 S | 8/2016 | Choi |
| D765,008 S | 8/2016 | Conrad |
| D767,238 S | 9/2016 | Jennings |
| D767,328 S | 9/2016 | Boroski |
| D767,337 S | 9/2016 | Boroski |
| D768,435 S | 10/2016 | Hoorntje |
| D771,439 S | 11/2016 | Miller |
| D772,651 S | 11/2016 | Leonard |
| D773,250 S | 12/2016 | Miller |
| D774,837 S | 12/2016 | Seiders |
| 9,555,948 B2 | 1/2017 | Nemeth et al. |
| D779,275 S | 2/2017 | Crosby |
| D779,276 S | 2/2017 | Crosby |
| D780,577 S | 3/2017 | Seiders |
| D781,101 S | 3/2017 | Barber |
| D781,145 S | 3/2017 | Seiders |
| D781,146 S | 3/2017 | Seiders |
| D782,150 S | 3/2017 | Briganti |
| D783,368 S | 4/2017 | Seiders |
| D784,137 S | 4/2017 | Cates |
| D786,619 S | 5/2017 | Joseph |
| D787,270 S | 5/2017 | Mishan |
| D789,134 S | 6/2017 | Lin |
| D789,737 S | 6/2017 | Eyal |
| D794,460 S | 8/2017 | Notheis |
| D795,008 S | 8/2017 | Eyal |
| D795,013 S | 8/2017 | Shultz |
| D795,630 S | 8/2017 | McLean |
| D795,643 S | 8/2017 | Barlow |
| D797,488 S | 9/2017 | Silsby |
| D799,320 S | 10/2017 | Goodwin |
| 9,801,482 B1 | 10/2017 | Alexander |
| D802,362 S | 11/2017 | Spivey |
| D804,905 S | 12/2017 | Seiders |
| D805,852 S | 12/2017 | Seiders |
| D807,712 S | 1/2018 | Miller |
| D808,802 S | 1/2018 | Seiders |
| D812,432 S | 3/2018 | Seiders |
| D812,979 S | 3/2018 | Seiders |
| D814,240 S | 4/2018 | Kabalin |
| D814,243 S | 4/2018 | Pape |
| D814,852 S | 4/2018 | Melanson |
| D815,482 S | 4/2018 | Bell |
| D815,890 S | 4/2018 | Boroski |
| D815,903 S | 4/2018 | Steel |
| D816,162 S | 4/2018 | Fassi |
| D816,165 S | 4/2018 | Haug |
| D816,398 S | 5/2018 | Fleischhut |
| D817,093 S | 5/2018 | Silsby |
| D819,396 S | 6/2018 | Seiders |
| D819,405 S | 6/2018 | Li |
| D820,044 S | 6/2018 | Jenkins |
| D820,085 S | 6/2018 | Moore |
| D823,042 S | 7/2018 | Bell |
| D823,062 S | 7/2018 | Goodwin |
| D823,537 S | 7/2018 | Beaver |
| D826,641 S | 8/2018 | Nickley |
| D829,056 S | 9/2018 | Wall |
| D830,128 S | 10/2018 | Rohe |
| D833,820 S | 11/2018 | Bram |
| D834,881 S | 12/2018 | Seiders |
| D835,459 S | 12/2018 | Sedgwick |
| 10,160,661 B2 | 12/2018 | Gregory |
| D839,676 S | 2/2019 | Seiders |
| D840,187 S | 2/2019 | Sams |
| D841,391 S | 2/2019 | Pape |
| D842,027 S | 3/2019 | Boroski |
| D842,038 S | 3/2019 | Seiders |
| D843,212 S | 3/2019 | Seiders |
| D844,383 S | 4/2019 | Seiders |
| D845,694 S | 4/2019 | Liu |
| D846,995 S | 4/2019 | El Beaini |
| D847,579 S | 5/2019 | Khan |
| D848,791 S | 5/2019 | Khayman |
| 10,278,534 B2 | 5/2019 | Miller |
| 10,329,070 B2 | 6/2019 | Wengerd |
| D855,390 S | 8/2019 | Lullie |
| D857,462 S | 8/2019 | Silsby |
| D862,992 S | 10/2019 | Wong |
| D864,645 S | 10/2019 | Perez |
| D867,058 S | 11/2019 | Spivey |
| 10,479,544 B2 | 11/2019 | Crosby |
| D868,536 S | 12/2019 | Henkel |
| D871,820 S | 1/2020 | Zou |
| D871,844 S | 1/2020 | Adams, Jr. |
| D871,849 S | 1/2020 | Ko |
| D872,539 S | 1/2020 | Hewitt |
| D873,088 S | 1/2020 | Lee |
| D873,603 S | 1/2020 | Diener |
| D873,610 S | 1/2020 | Stanton |
| D874,216 S | 2/2020 | Henkel |
| D876,893 S | 3/2020 | Xu |
| D877,609 S | 3/2020 | Elman |
| D878,160 S | 3/2020 | Corbet |
| D878,848 S | 3/2020 | Hu |
| D878,932 S | 3/2020 | Holley, Jr. |
| D879,069 S | 3/2020 | Chang |
| D882,111 S | 4/2020 | Bib |
| D882,334 S | 4/2020 | Henkel |
| D882,339 S | 4/2020 | Pape |
| D882,343 S | 4/2020 | Rane |
| D884,472 S | 5/2020 | Matauch |
| D885,177 S | 5/2020 | Sevsek |
| D885,835 S | 6/2020 | Adams, Jr. |
| D886,525 S | 6/2020 | Seiders |
| D887,764 S | 6/2020 | Henkel |
| D887,765 S | 6/2020 | Henkel |
| D887,774 S | 6/2020 | Matauch |
| D890,573 S | 7/2020 | Jacobsen |
| D891,168 S | 7/2020 | Zou |
| D891,966 S | 8/2020 | Fort, Jr. |
| D894,684 S | 9/2020 | Kander |
| D896,026 S | 9/2020 | Chu |
| D897,777 S | 10/2020 | Kaiser |
| D899,862 S | 10/2020 | Rane |
| 10,835,067 B2 * | 11/2020 | Rane ................ A47G 23/0266 |
| D904,125 S | 12/2020 | Jacobsen |
| 10,864,490 B1 | 12/2020 | Zolorzano |
| D908,444 S | 1/2021 | Pape |
| D909,143 S | 2/2021 | Pisarevsky |
| D911,109 S | 2/2021 | Johnson |
| D911,779 S | 3/2021 | Hunter |
| D913,046 S | 3/2021 | Spivey |
| D913,738 S | 3/2021 | Jewett |
| D922,145 S | 6/2021 | Kuh |
| D925,290 S | 7/2021 | Melanson |
| D926,523 S | 8/2021 | Henkel |
| D927,979 S | 8/2021 | Jiang |
| 11,142,675 B2 * | 10/2021 | Ma ........................ B65D 51/24 |
| D934,633 S | 11/2021 | Hunter |
| D935,278 S | 11/2021 | Hunter |
| D939,278 S | 12/2021 | Vierck |
| D939,896 S | 1/2022 | Brownsberger |
| D944,600 S | 3/2022 | Pisarevsky |
| D946,346 S | 3/2022 | Pape |
| D946,352 S | 3/2022 | Pape |
| D947,613 S | 4/2022 | Wahl |
| 11,304,549 B2 | 4/2022 | Cheng |
| D950,318 S | 5/2022 | Scott |
| D954,508 S | 6/2022 | Ni |
| D960,645 S | 8/2022 | Ji |
| D960,647 S | 8/2022 | Yang |
| D970,971 S | 11/2022 | Haskins |
| D981,788 S | 3/2023 | Pape et al. |
| D982,386 S | 4/2023 | Pape et al. |
| D995,188 S | 8/2023 | Pape |
| D1,009,544 S | 1/2024 | Pape |
| D1,019,281 S | 3/2024 | Pape |
| 2003/0059500 A1 | 3/2003 | Bailey |
| 2003/0076673 A1 | 4/2003 | Diak/Ghanem |
| 2006/0177159 A1 | 8/2006 | Aikenhead |
| 2007/0272650 A1 | 11/2007 | Kishi |

(56) References Cited

U.S. PATENT DOCUMENTS

| | | |
|---|---|---|
| 2008/0006643 A1 | 1/2008 | Ma |
| 2008/0073343 A1 | 3/2008 | Shadrach |
| 2008/0073347 A1 | 3/2008 | Shadrach |
| 2008/0237242 A1 | 10/2008 | Gifford |
| 2009/0045194 A1* | 2/2009 | Rhee ............... B65D 81/3869 220/23.89 |
| 2009/0283526 A1 | 11/2009 | Pierce |
| 2010/0200590 A1 | 8/2010 | Shadrach, III |
| 2010/0206874 A1 | 8/2010 | Masurier |
| 2010/0288776 A1 | 11/2010 | Bodum |
| 2010/0288782 A1 | 11/2010 | Lin |
| 2011/0198352 A1 | 8/2011 | Lown |
| 2012/0000369 A1 | 1/2012 | Saitoh |
| 2012/0205371 A1 | 8/2012 | Lee |
| 2012/0247998 A1 | 10/2012 | Wahl |
| 2012/0312816 A1 | 12/2012 | Barreto |
| 2013/0320013 A1 | 12/2013 | Bratsch |
| 2013/0334166 A1 | 12/2013 | Garipalli |
| 2014/0061208 A1 | 3/2014 | Boyd |
| 2014/0102965 A1 | 4/2014 | Jones |
| 2015/0083791 A1 | 3/2015 | Gonzalez |
| 2015/0158657 A1 | 6/2015 | Olson |
| 2015/0197390 A1 | 7/2015 | Kurabe |
| 2015/0374151 A1 | 12/2015 | Lin |
| 2016/0058227 A1 | 3/2016 | Albers |
| 2016/0073824 A1 | 3/2016 | Harrod |
| 2016/0100702 A1 | 4/2016 | Albers |
| 2016/0137332 A1 | 5/2016 | Crosby |
| 2016/0150901 A1 | 6/2016 | Chang |
| 2016/0198875 A1 | 7/2016 | Mithal |
| 2016/0355318 A1 | 12/2016 | Epenetos |
| 2017/0055743 A1 | 3/2017 | Jorge |
| 2017/0071394 A1 | 3/2017 | Numata |
| 2017/0096258 A1 | 4/2017 | Seiders |
| 2017/0101209 A1 | 4/2017 | Viedt |
| 2017/0231418 A1 | 8/2017 | Bebo |
| 2017/0251850 A1 | 9/2017 | Coon |
| 2017/0253392 A1 | 9/2017 | Bann |
| 2017/0259983 A1 | 9/2017 | Tolman |
| 2017/0260617 A1 | 9/2017 | Lien |
| 2017/0273484 A1 | 9/2017 | Spivey |
| 2017/0367536 A1 | 12/2017 | Wall |
| 2018/0014675 A1 | 1/2018 | Awala |
| 2018/0050925 A1 | 2/2018 | Gregory |
| 2018/0134520 A1 | 5/2018 | Mikkonen |
| 2018/0194520 A1 | 7/2018 | Lovern |
| 2018/0257853 A1 | 9/2018 | Chuang |
| 2018/0263404 A1 | 9/2018 | Pisarevsky |
| 2018/0312322 A1 | 11/2018 | Canales Kell |
| 2019/0029460 A1 | 1/2019 | Cohen |
| 2019/0313837 A1 | 10/2019 | Wu |
| 2020/0154941 A1 | 5/2020 | Torrey |
| 2021/0024261 A1 | 1/2021 | Brown |
| 2021/0127870 A1 | 5/2021 | Torsvik |
| 2021/0186240 A1 | 6/2021 | Manochio |
| 2021/0206539 A1 | 7/2021 | Lovern, IV |
| 2021/0282587 A1 | 9/2021 | Maskell |
| 2021/0289966 A1 | 9/2021 | Chuang |
| 2021/0289987 A1 | 9/2021 | Maskell |
| 2021/0361053 A1 | 11/2021 | Stewart-Stand |
| 2021/0369023 A1 | 12/2021 | Li |
| 2021/0401227 A1 | 12/2021 | Haas |
| 2022/0047119 A1 | 2/2022 | Tolman |

FOREIGN PATENT DOCUMENTS

| | | |
|---|---|---|
| CN | 302892948 | 7/2014 |
| CN | 302893051 | 7/2014 |
| CN | 303140457 | 3/2015 |
| CN | 303140530 | 3/2015 |
| CN | 303688825 | 6/2016 |
| CN | 205696974 | 11/2016 |
| CN | 304115598 | 4/2017 |
| CN | 304164536 | 6/2017 |
| CN | 304264076 | 9/2017 |
| CN | 304290833 | 9/2017 |
| CN | 304312013 | 10/2017 |
| CN | 304551929 | 3/2018 |
| CN | 304828374 | 9/2018 |
| CN | 304916867 | 11/2018 |
| CN | 110172697 | 8/2019 |
| CN | 305324556 | 8/2019 |
| CN | 305444296 | 11/2019 |
| CN | 305489506 | 12/2019 |
| CN | 305502351 | 12/2019 |
| CN | 305925957 | 7/2020 |
| CN | 306050530 | 9/2020 |
| CN | 306186841 | 11/2020 |
| CN | 306388363 | 3/2021 |
| CN | 306608308 | 6/2021 |
| CN | 306668206 | 7/2021 |
| CN | 306800309 | 9/2021 |
| CN | 306800314 | 9/2021 |
| CN | 306815495 | 9/2021 |
| CN | 307039518 | 12/2021 |
| CN | 307286194 | 4/2022 |
| CN | 307334268 | 5/2022 |
| CN | 307334364 | 5/2022 |
| CN | 307334367 | 5/2022 |
| CN | 307334380 | 5/2022 |
| CN | 307529924 | 9/2022 |
| CN | 307567103 | 9/2022 |
| CN | 307578294 | 10/2022 |
| CN | 307578346 | 10/2022 |
| CN | 307598361 | 10/2022 |
| CN | 307619861 | 10/2022 |
| CN | 307620109 | 10/2022 |
| CN | 307629494 | 11/2022 |
| EM | 008742423-0001 | 11/2021 |
| GB | 2389845 A | 12/2003 |
| GB | 9006624193-0001 | 7/2019 |
| IN | 314442-001-0001 | 3/2022 |
| JP | 61227053 | 10/1986 |
| JP | H02 11779 | 1/1990 |
| JP | H0211779 A | 1/1990 |
| JP | 2774564 | 7/1998 |
| JP | 2000116541 A * | 4/2000 |
| JP | D1507855 | 9/2014 |
| JP | 2016152878 | 8/2016 |
| JP | 2016152878 A | 8/2016 |
| JP | D1663539 | 7/2020 |
| JP | D1692169 | 9/2021 |
| KR | 10-1992-0009830 | 10/1992 |
| KR | 301017359 | 8/2019 |
| KR | 301042237.0000 | 1/2020 |
| KR | 301163473 | 5/2022 |
| TW | 218755-0001 | 5/2022 |
| WO | D084003-001 | 1/2015 |
| WO | D091620-003 | 1/2017 |
| WO | D096253-040 | 6/2017 |
| WO | 2021086854 | 5/2021 |

OTHER PUBLICATIONS

English Translation JP-2000116541-A (Year: 2000).*
Bhandari, "How to Properly Apply Enamel Paint", retrieved from URL: https://www.doityourself.com/stry/how-to-properly-apply-enamel-paint.
Steel, "Greens Steel Beast Handle for 20oz Tumblers Rambler Cup—Black", retrieved from URL; https://www.amazon.com/Greens-Steel-Handle-Tumblers.
"Tervis Lids", retrieved from http://www.tervis.com/designs/Accessories/Travel-lids/dc0fe00377e0ec722da5bdl46541427c#!upc093597437694&upc093597240386 on Oct. 1, 2024.
[Aloufea 12oz Stainless Steel Insulated Coffee Mug with Handle], available in Amazon.com, date first available Feb. 29, 2020 [online], [site visited Dec. 14, 2022], Available from the internet URL: https://www.amazon.com/Stainless-Insulated-Coffee-Tumbler-Sliding/dp/B085BJ4MLK/ (Year: 2020).
[Pack of 6 Camping Coffee Mug Drinking Soup Cup (12 oz), available in Amazon.com, date first available Feb. 20, 2020 [online], (56) References Cited

OTHER PUBLICATIONS

[site visited Dec. 14, 2022], Available from the internet URL: https://www.amazon.com/Stainless-Steel-Camping-Coffee-Drinking/dp/B08511VQKV/ (Year: 2020).
16oz Ripple-Wrap™ Hot Cup_ Cups & Cup Accessories [online] URL: https://www.detpak.com/detpak/cups-cup-accessories/ripple-wrap-hot-cups/r292s0001/ (site visited: Aug. 2021) (Year: 2021).
Amazon.com, Asobu Skinny Can Cooler, Earliest comment date Apr. 13, 2020, [site visited Jun. 10, 2020], Available on the Internet URL: https://www.amazon.com/Skinny-Cooler-Insulated-Stainless-Reusable/dp/B085TPFCJY (Year: 2020).
Amazon.com, Tahoe Trails Double Wall Vacuum Insulated Can Cooler, First available on Amazon Jun. 2, 2020, [site visited Jun. 10, 2020], Available on the Internet URL: https://www.amazon.com/dp/B072KBHSQR (Year: 2020).
Amazon: Chemex Pour-Over Glass Coffeemaker. First available 2007. https://www.amazon.com/Chemex-Classic-Pour-over-Glass-Coffeemaker/dp/B00011WP7W.
Chemex Brew Guide. Oct. 2017. https://bluestonelane.com/chemex-brew-guide/.
Daniel Jessep [online] URL: https://danieljessep.co.nz/products/coffee-cup-jade-fluted (site visited: Jun. 30, 2022) (Year: 2022).
Diminish [online] URL: https://www.diminish.com.au/products/onya-reusable-travel-coffee-cup?variant=38825400533177 (site visited: Jun. 30, 2022) (Year: 2020).
Filter Folding 101: Chem ex. 2015. https://web.archive.org/web/20170129191327/https://www.chemexcoffeemaker.com/filter-folding-101.
Green Distributors [online] URL: https://thegreendistributors.com/products/large-coffee-cup-zero-waste-mug (site visited: Jun. 30, 2022) (Year: 2022).
Simple Modern Wine Tumbler https://www.amazon.com/dp/B076CVHV6G/ref=twister_B07HJF71DH?_encoding=UTF8&psc=1 (Year: 2018).
"KALMATEH Modern & Elegant Yerba Mate Thermos" URL: https://www.amazon.com/dp/B081B8LV77/ref=cm_sw_em_r_mt_dp_3q4.FbPY3ZKQF?_encoding=UTF8&psc=1 (Year:2019).
https://www.amazon.com/MAGEDON-Carrier-handheld-Running-jogging/dp/B07FMTQ5Y2/ref=sr_1_25?dchild=1&keywords=thermos+bottle+with+handle&qid=1621704019&sr=8-25 (Year: 2019).
https://www.amazon.com/Simple-Modern-Classic-Tumbler-Straw/dp/B07D4BNCCM/ref=sr_1_16?dchild=1&keywords=lid+with+removable+straw&qid=1630612378&sr=8-16. Simple Modern (Year: 2018).
Huskee Cup and Lid [online] URL: https://www.amazon.com/Huskee-Cup-Lid-Natural-12oz/dp/B07XGKMKT7/ (site visited: Aug. 2021) (Year: 2019).
Kaffeeform—Reusable Weducer Cup [online] URL: https://www.kaffeeform.com/en/shop/weducer-cup/ (site visited: Aug. 2021) (Year: 2020).
L'ifeager [online] URL: https://www.amazon.com/Lifeager-Toughened-Dishwasher-Microwave-Christmas/dp/B0BN1DVVBM (site visited Jun. 30, 2022) (Year: 2020).
MCM Ribbed Tumbler _ Etsy [online] URL: https://www.etsy.com/listing/902531336/mcm-ribbed-tumblerdrinking-glass? (site visited: Feb. 2021) (Year: 2000).
Miir Travel Tumbler| posted at Amazon.com, posted on Aug. 21, 2018, © 1996-2018 Amazon.com, [online], [site visited Jun. 11, 2024]. Available from Internet, <URL: https://www.amazon.co.uk/MiiR-Insulated-Tumbler-Locking-Compatible/dp/B07GQ4T12M/> (Year: 2018).
Mir French Press, amazon.com, First available date Jun. 30, 2023. Retrieved from the internet Mar. 27, 2024<https://www.amazon.com/MiiR-Standard-French-Press-Black/dp/BOC9V7X9YZI?ref=as_d_BOC9V7X9YZI?th=1 (Year: 2023).
MiiR website, Can Chiller, Earliest comment date Sep. 28, 2019, [site visited Jun. 10, 2020], Available on the Internet URL https://www.miir.com/products/can-chiller (Year: 2019).

ONDE Vase Natural or Mist White Minimalist wooden vase _ Etsy [online] URL: https://www.etsy.com/listing/1037014647/onde-vase-natural-or-mist-white? (site visited: Aug. 2021) (Year: 2021).
Pack of 8 Coffee Cups With Lids [online] URL: https://www.therange.co.uk/cooking-and-dining/outdoor-dining/ (site visited: Aug. 2021) (Year: 2021).
Patient Cups Plastic Ribbed 5oz Lavender 1 000_case [online] URL: https://www.dhpsupply.com/item/630-9210/Patient-Cups-Plastic-Ribbed/ (site visited: Aug. 2021) (Year: 2021).
"Photo of a takeaway disposable paper co . . . " [online] URL: https://www.alamy.com/stock-photo-photo-of-a-takeaway-disposable-paper-coffee-cup-on-a-background-of-48109339.html? (site visited: Aug. 2021) (Year: 2012).
Pleated Vacuum Cleaner Air Filter Cartridge PTFE Material 0112311 Model [online] URL: https://www.cartridgefilterelement.com/sale-11508762-pleatedvacuum-cleaner-air-filter-cartridge-ptfe-material-0112311-model.html (site visited: Aug. 2021) (Year: 2021).
Ripple Cups, Ripple Coffee Cups, Ripple Paper Cups in Stock—U Line [online] URL: https://www.uline.com/BL_594/Uline-Ripple-Insulated-Cups (site visited: Aug. 2021) (Year: 2020).
Tronco 20oz Glass Tumbler Straw Silicone Protective Sleeve Bamboo Lid—BPA free. URL: https://www.amazon.com/dp/B07H3SNFQN/ref=cm_sw_em_r_mt_dp_M87K7J1FQGEJ597A46AC?_encoding=UTF8&psc=1 (year:2017).
Amazon.com, Yeti Rambler, Earliest comment date Apr. 4, 2018, [site visited Jun. 10, 2020], Available on the Internet URL: www.amazon.com/YETI-Rambler-Colster-Bottle-Holder/dp/B01LA7ABYG (Year: 2018).
"anypromo.com, Rover Copper Vacuum Insulated Camp Mug 14 oz, [site visited Sep. 5, 2023] Available from the internet URL: https://www.anypromo.com/mugs-drinkware/thermoses/rover-copper-vacuum-insulated-camp-mug-14-oz-p750994?utm_source=PLA&utm_medium=PC&utm_campaign=750994&s=1&glppc=1&gclid=CjwKCAjwhqXbBRAREiwAucoo-zfsoMj2rPRPqac06HFiNthX-tOrE1z8uLppbmU4ppjqMi0kCVp20xoCtYAQAvD_BWE".
The Quencher H2.0 Flowstate™ Tumbler | 30 OZ [online] URL: https://www.stanley1913.com/products/adventure-quencher-travel-tumbler-30-oz?variant=44560012083327 (site visited Jul. 22, 2024) (Year: 2022).
PCNA, Rover Copper Vacuum Insulated Camp mug 14oz [site accessed Sep. 5, 2023], Available from the internet URL: https://www.pcna.com/en-us/product/rover-copper-vacuum-insulated-camp-mug-14oz-1625-76.
SM [online] URL: https://www.amazon.com/Simple-Modern-Voyager-Travel-Tumbler/dp/B07T36NQGX/ (site visited: Feb. 16, 2022) (Year: 2020).
Guardian Collection by THER . . . [online] URL: https://www.amazon.com/Guardian-Collection-Thermos-Stainless-Tumbler/dp/B07XYRLP2P (site visited: Aug. 2021) (Year: 2019).
Hydro Flask 10 oz Rocks Cup . . . [online] URL: https://www.amazon.com/Hydro-Flask-Stainless-Vacuum-Insulated/dp/B07MZC5DJX/ref=sr_1_1?dchild=1&keywords=B07MZC5DJX&qid=1631115501&s=home-garden&sr=1-1 (site visited: Aug. 2021) (Year: 2019).
Ice Shaker [online] URL: https://www.amazon.com/Ice-Shaker-Skinny-Tumbler-Black/dp/B07ZQRXR3M (site visited: Sep. 2021) (Year: 2019).
"Maars Drinkware 12 oz Double Wall [online] URL: https://www.amazon.com/Maars-Drinkware-78921-2PK-Insulated-Tumbler/dp/B07L9J978K/ref=sr_1_112dchild=1&keywords=hydro%2Bflask%2B16%2Boz%2Btumbler%2Bsilver&qid=1635886790&sr=8-112&th=1 (site visited: Nov. 3, 2021) (Year: 2018)".
MiiR Stainless Steel Airti . . . [online] URL: https://www.amazon.com/MiiR-Canister-Storing-Airtight-Storage/dp/B07VKFK2F6/ref=cm_cr_arp_d_product_top?ie=UTF8 (site visited: Aug. 2021) (Year: 2019).
Mininoo 20oz Tumbler, Stain . . . [online] URL: https://www.amazon.com/Mininoo-Tumbler-Stainless-Insulated-Flask-Havana/dp/B08CH5JYZ2/ref=sr_1_1?dchild=1&keywords=B08CH5JYZ2&qid=1631115594&s=home-garden&sr=1-1 (site visited: Aug. 2021) ( Year: 2020).

(56) References Cited

OTHER PUBLICATIONS

Sunwill 20 oz tumbler with lid [online] URL: https://www.amazon.com/SUNWILL-Tumbler-Stainless-Insulated-Durable/dp/B07Q2CQBB4 (site visited: May 24, 2022) (Year: 2018).

MiiR Insulated Travel Tumbl . . . [online] URL: https://www.amazon.com/MiiR-Insulated-Tumbler-Locking-Compatible/dp/B07PYKK8ZB (site visited: Aug. 2021) (Year: 2019).

SUNWILL Double Wall Coffee Cup, Insulated Coffee Mug Stainless Steel Slim Travel Tumbler Mini 12oz, White_Tumblers & Water Glasses [online] URL: https://www.amazon.com/SUNWILL-Double-Insulated-Stainless-Tumbler/dp/B07RJHSL74?ref_=ast_sto_dp& th=1 (site visited: Sep. 2021) (Year: 2019).

CKB [online] URL: https://www.amazon.com/Custom-Personalized-Stainless-Double-Wall-Tumbler/dp/B07DRMH462/ (site visited: Feb. 16, 2022) (Year: 2017).

Coleman [online] URL: https://www.amazon.com/Coleman-Insulated-Stainless-Tumbler-Heritage/dp/B071HV8VY2/ (site visited: Feb. 16, 2022) (Year: 2017).

Juro [online] URL: https://www.amazon.com/Jura-Tumbler-Double-Stainless-Installation/dp/B07MJR3P1H (site visited: Feb. 15, 2022) (Year: 2019).

MiiR [online] URL: https://www.patagonia.com/product/miir-fitz-etch-20-oz-tumbler/192964429000.html (site visited: Feb. 16, 2022) ( Year: 2019).

Sunwill [online] URL: https://www.amazon.com/SUNWILL-Tumbler-Stainless-Insulated-Durable/dp/B07VVLWTS7/ (site visited: Feb. 16, 2022) (Year: 2019).

Yeti [online] URL: https://www.amazon.com/YETI-Vacuu-Rambler-Stainless-Steel/dp/B07FM5HLMF/ (site visited: Feb. 16, 2022) (Year: 2018).

Yeti website https://www.yeti.com/en_US/drinkware/rambler-20-oz-tumbler/YRAM20.html?dwvar_YRAM20_coloFstainless-steel &cgid drinkware#start | (Jun. 2017).

Yeti MagSlider https://www.youtube.com/watch?vMihG4zYXcXO (Year: 2017).

Yeti Rambler Youtube https://youtu.be/43yi2PG23VYYeti Rambler Feb. 22, 2015.

* cited by examiner

METHODS FOR MAKING A CONTAINER, AND RELATED SYSTEMS

CROSS-REFERENCE TO RELATED APPLICATIONS AND INCORPORATION BY REFERENCE

This application claims priority from U.S. Provisional Patent Application 62/956,781 filed 3 Jan. 2020 and titled "Container, and Related Systems and Methods". This application also incorporates by this reference the entirety of U.S. Provisional Patent Application 62/956,781.

BACKGROUND

Many containers that are made of a metal and are used for drinking hot and/or cold beverages include either a vacuum-sealed outer portion that surrounds the portion of the container that holds the beverage to be consumed, or an enamel coating that covers the surface or surfaces of the container that are exposed to the outside ambient environment. The vacuum-sealed outer portion helps maintain the temperature of the beverage held by the container by mitigating the flow of heat into the beverage if the beverage is colder than the ambient environment, or out of the beverage if the beverage is warmer than the ambient environment. The enamel coating protects the metal of the container, provides a fresh, clean taste that doesn't retain or transfer flavors, makes it easier to clean the container, and provides many more options for decorating the container than exposed metal.

Unfortunately, such metal containers do not include both a vacuum-sealed outer portion and an enamel coating because the process for including one in a container conflicts with the process for including the other in a container. If one formed the vacuum-sealed outer portion before forming the enamel coating, heating the enamel to form the glaze on the container would deform or explode the container by generating very high pressures inside the vacuum-sealed outer portion. And, if one formed the enamel coating before forming the vacuumed-sealed outer portion, liquid enamel would penetrate into the cavity to be vacuum-sealed and reduce the effectiveness of the vacuum-sealed outer portion's thermal barrier.

Thus, there is a need for a container that includes both a vacuum-sealed outer portion and an enamel coating that covers the surface or surfaces of the container that is/are exposed to the outside ambient environment.

SUMMARY

In one aspect of the invention, a method for making a container includes forming a first cavity of a container by shaping an inner wall so that a first surface of the inner wall defines the first cavity; forming a second cavity of the container by shaping an outer wall so that a third surface of the outer wall surrounds a second surface of the inner wall such that together the third and second surfaces define the second cavity; and connecting the inner and outer walls together. The method then includes forming a hole through the outer wall to expose the second cavity to the outside ambient environment; and then applying an enamel coating on at least one of the following: the first surface of the inner wall and a fourth surface of the outer wall that is exposed to the outside ambient environment, while preventing the enamel coating from being deposited in the hole. After the enamel coating is applied, the method includes heating the container to glaze the enamel coating and fix the coating to the one or more surfaces. After the enamel is glazed, the method includes removing air from the second cavity; and then while the air is removed from the second cavity, sealing the second cavity so that the pressure inside the second cavity is less than the pressure in the outside ambient environment.

By forming the hole through the outer wall and preventing enamel from being applied to the hole, one can prevent enamel coating from entering the second cavity. And by glazing the enamel coating before sealing the second cavity with less pressure than the outside ambient environment, one can prevent the process for glazing the enamel coating from damaging the sealed second cavity. Thus, one can produce a container that includes both a sealed second cavity and an enamel glaze in the first cavity and/or the exterior of the container, so that the container can efficiently maintain the temperature of the beverage held in the container's first cavity while having an ornate and decorative appearance that protects the inner and outer walls, provides a fresh, clean taste that doesn't retain or transfer flavors, and allows the walls to be easily cleaned.

In another aspect of the invention, a container for holding a liquid includes an inner wall, an outer wall connected to the inner wall, and an enamel coating. The inner wall includes a first surface and a second surface, the first surface defining a first cavity in which a liquid may be held. The outer wall includes a third surface and a fourth surface, and is positioned relative to the inner wall such that the outer wall's third surface surrounds the inner wall's second surface and, together, the third and second surfaces define a second cavity. The second cavity is sealed from the ambient environment outside the inner wall's first surface and the outer wall's fourth surface and has a pressure that is less than the pressure of the outside ambient environment. The enamel coating is disposed on at least one of the inner wall's first surface and the outer wall's fourth surface.

DETAILED DESCRIPTION

Figure 1:
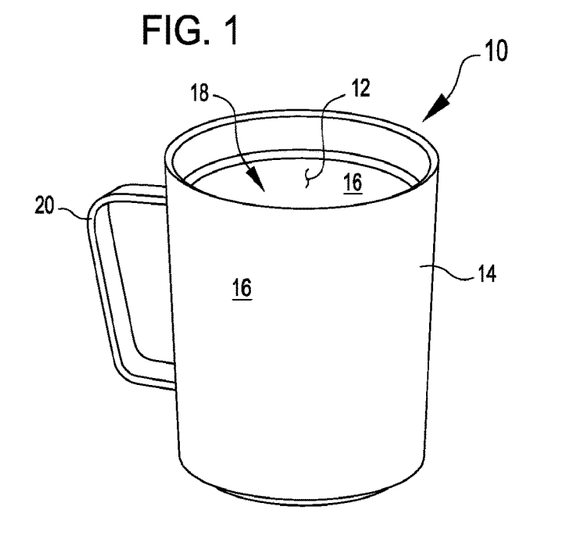
FIG. 1 shows a perspective view of a container, according to an embodiment of the invention.

FIG. 1 shows a perspective view of a container 10, according to an embodiment of the invention. The container 10 may be used to hold anything such as a beverage (hot or cold), food (hot or cold), and/or other items that may or may not be consumed. The container 10 includes an inner wall 12, an outer wall 14 and an enamel coating 16 that covers the inner wall 12 and the outer wall 14. The container 10 also includes a first cavity 18 that is defined by the inner wall 12, and a second cavity (not shown here, but shown and discussed in greater detail in conjunction with FIGS. 3 and 4) that is defined by both the inner wall 12 and the outer wall 14. The second cavity has had air removed from it and then sealed to prevent air from the outside ambient environment from getting back in to it. Because, the second cavity has less air for its volume than the outside ambient environment, the second cavity has a pressure that is less than the pressure in the outside ambient environment. And because the second cavity has less air for its volume, heat flows through the second cavity at a slow rate, which allows the second cavity to insulate the container's first cavity 18.

By including a sealed second cavity around the container's first cavity 18, and glazing an enamel coating on both the inner wall 12 and the outer wall 14, the container 10 can efficiently maintain the temperature of a beverage held in the container's first cavity 18 while having an ornate and decorative appearance that protects the inner and outer walls 12 and 14, respectively, and provides a fresh, clean taste that doesn't retain or transfer flavors.

Still referring to FIG. 1, the container may be made of any desired material capable of being formed into the container and able to withstand the physical and thermal loads that the container will experience during use. For example, in this and other embodiments, the container 10 is made of a metal. More specifically, the container 10 is made of 304 SS (stainless steel). With this material, the configuration of the container 10 may be formed from a single sheet of material by stamping, forming, and/or folding, which involves bending the material; and/or the container 10 may be formed in segments or portions that are then welded together to form the whole container 10.

The enamel coating 16 may be any desired enamel coating. For example, in this and other embodiments the enamel coating 16 is applied in one or more stages or layers and includes: 1) a matrix agent, such as silicon oxide, zirconia, and titanium oxide, 2) a flux such as sodium oxide, potassium oxide, and boron oxide, 3) an opacifier such as titanium oxide, antimony oxide, zirconia, and strontium oxide, 4) an adhesion agent such as, cobalt oxide, nickel oxide, copper oxide, antimony oxide, and molybdenum oxide, and 5) a colorant such as cobalt oxide (bright blue), copper oxide (green or red), chromium oxide (dark green); and iron oxide (ochre).

The container 10 may also include any other component. For example, here the container 10 includes a handle 20 that is welded to the outer wall 14 before the enamel coating is applied to the outer wall 14, and that allows one to more easily handle the container 10 than one could handle a container that has such a handle omitted, like a tumbler.

Other embodiments are possible. For example, the container 10 may include an enamel coating that only covers the inner wall 12, the outer wall 14, a portion of the inner wall 12, a portion of the outer wall 14, or just a portion of both the inner wall 12 and the outer wall 14.

Figure 2:
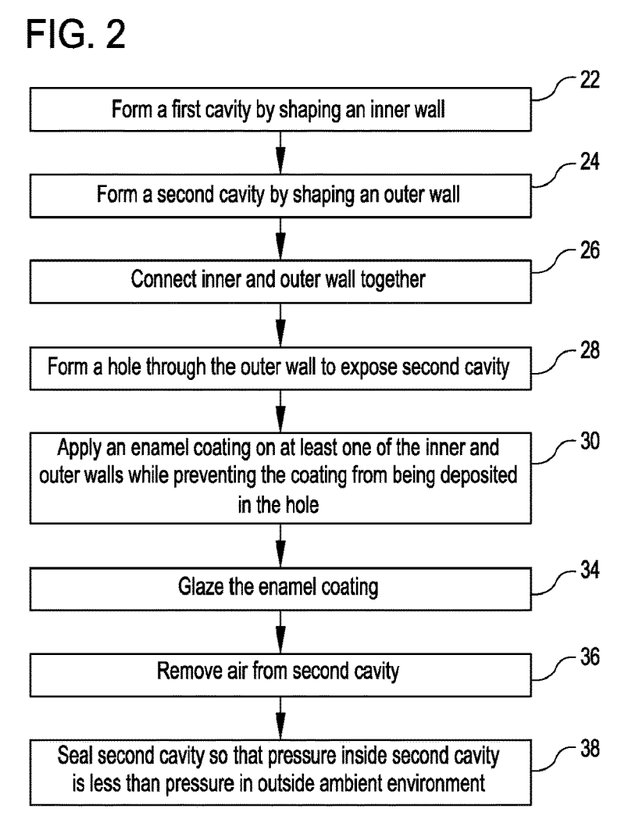
FIG. 2 shows a process for making the container shown in FIG. 1, according to an embodiment of the invention.

FIG. 2 shows a process for making the container 10 shown in FIG. 1, according to an embodiment of the invention. The process includes three general acts: 1) forming the first and second cavities of the container 10 (steps 22-26), 2) applying an enamel coating 16 to a section of the container 10 (steps 28-34), and then 3) increasing the insulative properties of the second cavity (steps 36 and 38).

More specifically, the first act of the process includes forming, at step 22, the first cavity 18 of the container 10 by shaping the inner wall 12 so that a first surface (shown in FIG. 3) of the inner wall 12 defines the first cavity 18. The formation of the first cavity 18, the second cavity and the connection of the inner and outer walls 12 and 14, respectively, are discussed in greater detail in conjunction with FIG. 3. The second step 24 of the process' first act includes forming a second cavity of the container 10 by shaping the outer wall 14 so that a third surface (shown in FIG. 3) of the outer wall 14 surrounds the second surface (also shown in FIG. 3) of the inner wall 12 such that together the third and second surfaces define the second cavity. And finally, the last step 26 of the process' first act includes connecting the inner wall 12 and the outer wall 14 together.

After the first and second cavities of the container 10 are formed, the enamel coating 16 is applied to the container 10. More specifically, the second act of the process includes forming, at step 28, a hole (shown in FIG. 3) through the outer wall 14, to expose the second cavity to the ambient environment outside of the outer wall 14. Then, the process includes applying, at step 30, the enamel coating 16 on at least one of the following: the first surface (shown in FIG. 3) of the inner wall 12 and the fourth surface (shown in FIG. 3) of the outer wall 14, while preventing the enamel coating from being deposited in the hole. After the enamel coating 16 is applied, the process includes heating, at step 34, the container to glaze the enamel coating 16 and fix the coating 16 to the one or more surfaces (shown in FIG. 3).

At step 28, the hole through the outer wall 14 may be formed using any desired technique. For example, in this and other embodiments, the hole is stamped into and through a base (shown in FIG. 3) that is then welded to the end (shown in FIG. 3) of the outer wall 14 located at the bottom of container 10. In this manner the base completes the outer wall 14 and encloses the second cavity except for the hole through the base. In other embodiments, the hole may simply be drilled through the outer wall 14 at any other location, or otherwise formed through the outer wall 14.

Still referring to FIG. 2, at step 30, the enamel coating 16 may be applied using any desired technique as long as the enamel coating is prevented from being deposited in the hole of the base. For example, in this and other embodiments the enamel coating 16 is applied to both the first surface of the inner wall 12 that defines the first cavity 18, and most of the outer wall 14 by dipping the container 10 into a bath of liquid enamel, and is prevented from reaching the hole by not allowing the region of the base where the hole is located to be dipped into the enamel bath. In other embodiments, the region of the base where the hole is located may be masked to prevent the liquid enamel from being deposited in the hole. In such embodiments, a region adjacent the hole is also masked to ensure that a clean metallic surface is available for a plug (shown in FIGS. 3 and 4) that will subsequently fill the hole and seal the second cavity. In still other embodiments, the enamel may be applied to only the first surface of the inner wall 12, only the fourth surface of the outer wall 14, or only to a portion of each of the first and fourth surfaces. In still other embodiments, the enamel may be painted on to the container 10 with a paint brush. This may be desirable to provide a unique aesthetic or ornate design to the container 10.

At step 34, the enamel coating 16 is heated using any desired technique. For example, in this and other embodiments the enamel is heated to about 800° C. in a conventional oven to glaze the enamel and fix it to the first surface of the inner wall 12 and the second surface of the outer wall 14.

By forming the hole through the outer wall 14 and preventing enamel from being applied to the hole, one can prevent enamel coating 16 from entering the second cavity. And by glazing the enamel coating 16 before sealing the second cavity with less pressure than the outside ambient environment, one can prevent the process for glazing the enamel coating 16 from damaging the sealed second cavity. Thus, one can produce a container 10 that includes both a sealed second cavity and an enamel glaze in the first cavity 18 and/or the exterior of the container 10, so that the container 10 can efficiently maintain the temperature of the beverage held in the container's first cavity 18 while having an ornate and decorative appearance.

Still referring to FIG. 2, after the enamel 16 is fixed onto the container 10, the second cavity's insulative properties are enhanced. More specifically, the third act of the process includes removing, at step 36, air from the second cavity. Then, at step 38, while the air is removed from the second cavity, the process includes sealing the second cavity so that the pressure inside the second cavity is less than the pressure in the outside ambient environment.

Removing air from the second cavity may be accomplished using any desired technique. For example, in this and other embodiments air may be removed from the second cavity by heating the second cavity to a temperature of about 400° C. in a conventional oven. At 400° C. the air's density is substantially less than the density of air at 20° C. because the heat excites or energizes the molecules in the air. This in turn increases the pressure of the air. If the air remained trapped inside the second cavity the pressure would rise commensurate with the increase in temperature. But because the second cavity is exposed to the outside ambient environment, heated air leaves the second cavity to equalize the pressure inside the second cavity with the pressure outside in the ambient environment. After a desired amount of air leaves the second cavity, the second cavity is sealed. Then, when the remaining air in the second cavity cools back down to the temperature of the outside ambient environment, the density of the air inside the second cavity is fixed, and thus its pressure decreases to less than the pressure in the ambient environment. And because less air is trapped in the second cavity, the ability of the second cavity to resist the flow of heat through it increases.

Figure 3:
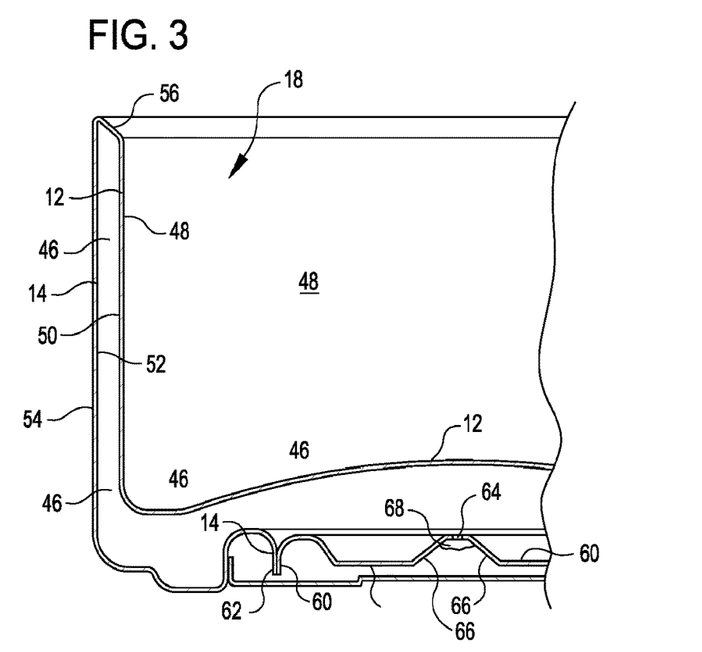
FIG. 3 shows a cross-sectional view of a portion of the container shown in FIG. 1, according to an embodiment of the invention.

FIG. 3 shows a cross-sectional view of a portion of the container 10 shown in FIG. 1, according to an embodiment of the invention. As previously mentioned, the container 10 includes a second cavity 46 that is defined by both the inner wall 12 and the outer wall 14, and that reduces the flow of heat into and out of the first cavity 18 to help insulate the first cavity 18. More specifically, the inner wall 12 includes a first surface 48 that defines the first cavity 18, and a second surface 50. The outer wall 14 includes a third surface 52, and a fourth surface 54. As previously mentioned, the first cavity 18 is defined by the first surface 48 of the inner wall 12. The second cavity 46 is defined by the second surface 50 of the inner wall 12 and the third surface 52 of the outer wall 14.

The first and second cavities 18 and 46, respectively, may be configured as desired. For example, in this and other embodiments the first cavity 18 is cylindrical in shape and includes an opening 56 that allows access to the first cavity 18 and that is located in a region of the inner wall 12. The second cavity 46 surrounds the first cavity 18 such that the inner wall 12 nests within the outer wall 14. And, the inner and outer walls 12 and 14, respectively, are connected to each other at the opening 56. More specifically, the inner and outer walls 12 and 14, respectively, are formed from a single, continuous piece of material such that the outer wall 14 extends from the inner wall's region where the opening 56 is located, and then down along the inner wall 12. In this manner, the second cavity 46 surrounds the whole first cavity 18 to efficiently insulate the first cavity 18.

The configuration of the container 10 may be completed as desired. For example, in this and other embodiments a circular base 60 is welded to the end 62 of the outer wall 14 at an interface that is formed between two flanges. The end 62 of the outer wall 14 forms one of the flanges; and the perimeter of the base 60 forms the other flange. The interface where the base 60 is welded to the outer wall 14 is the region of the two flanges that contact each other when the base 60 is positioned to form the bottom of the container 10. The hole 64 in the base 60 is located at the center of the base 60, at the top of the cone 66. The cone 66 does not have any enamel coating on it so that the plug 68 can make good contact with the surface of the metal. This allows plug 68 to form a good bond with the base 60 and keep the hole 64 filled and the second cavity 46 sealed.

Figure 4:
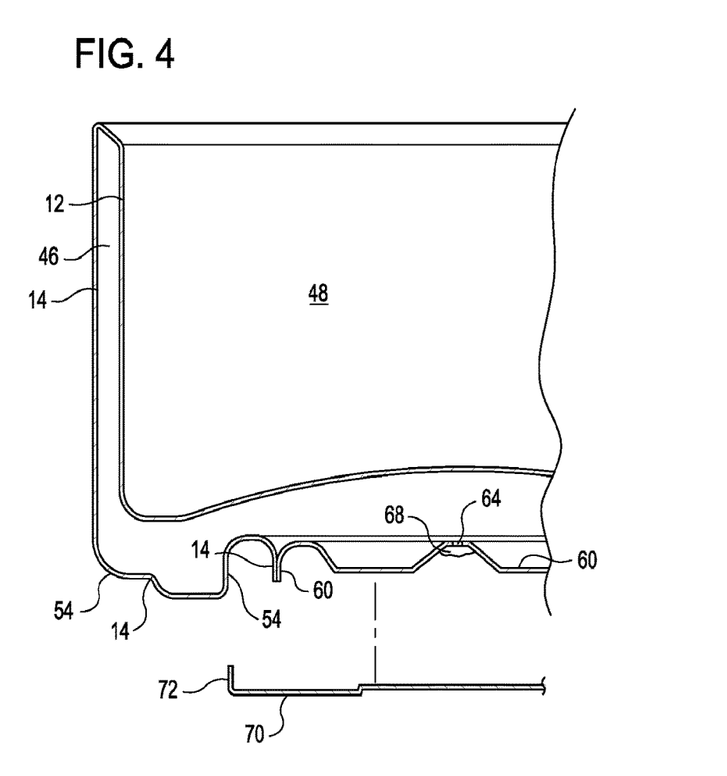
FIG. 4 shows a partially exploded, cross-sectional view of a portion of the container shown in FIG. 1, according to an embodiment of the invention.

FIG. 4 shows a partially exploded, cross-sectional view of the container shown in FIG. 1, according to an embodiment of the invention. After the enamel coating has been fixed to the fourth surface 54 via heat, the hole 64 is sealed with the plug 68 during the period when air is removed from the second cavity 46. The plug 68 seals the hole 64 by melting and then filling the hole 64 after a period of exposure to the heat during the air-removal process. The cover 70 is then coupled to the fourth surface 54 of the outer wall 14 to protect the plug 68 and cover any liquid enamel that was deposited on the base—i.e., overspray and/or over-dip. The cover 70 may be coupled to the fourth surface 54 in any desired manner. For example, in this and other embodiments the cover 70 is releasably held in place as shown in FIG. 3 by the outer wall 14 pinching the flange 72 of the cover 70. In other embodiments, the cover may be releasably coupled with a conventional snap. In still other embodiments, the cover 70 may be fixed to the outer wall 14 with an adhesive or by welding the cover 70 to the outer wall 14.

Figure 5:
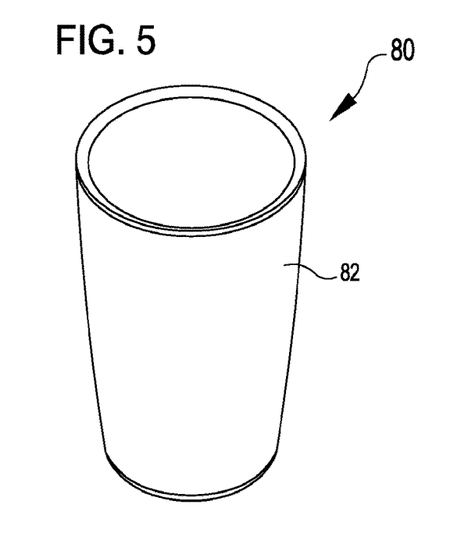
FIG. 5 shows a perspective view of another container, according to another embodiment of the invention.

FIG. 5 shows a perspective view of another container 80, according to another embodiment of the invention. The container 80 is similar to the container 10 shown in FIGS. 1, 3 and 4, and discussed in conjunction with FIGS. 1-4, except the container 80 is tumbler. Tumblers typically do not have a handle like the handle 20 shown in FIG. 1. Like these tumblers, the tumbler 80 also does not have a handle. Instead, one simply holds the tumbler by wrapping one's fingers around the outer wall 82.

Figure 6:
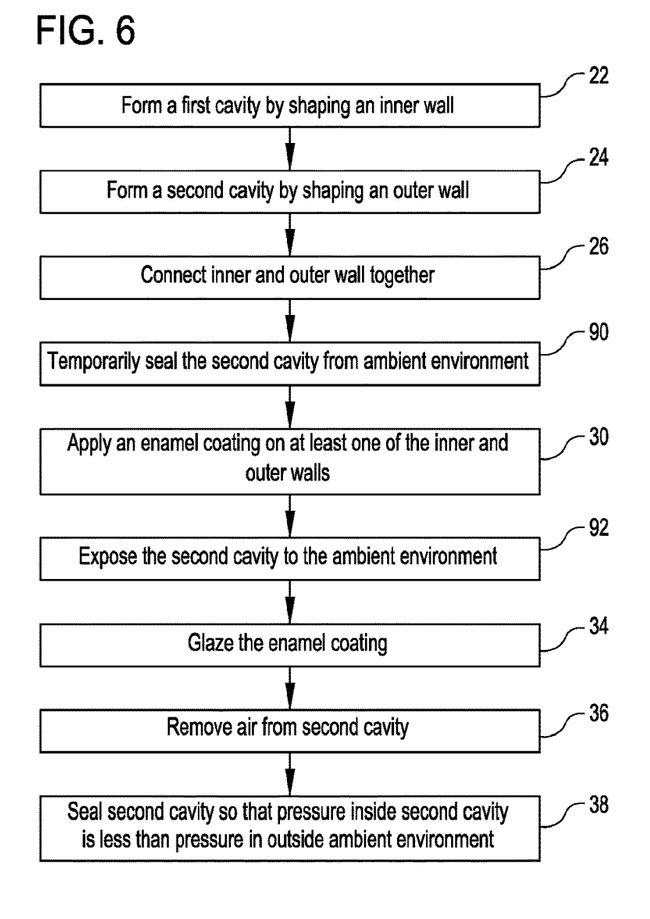
FIG. 6 shows another process for making the containers shown in FIGS. 1 and 5, according to another embodiment of the invention.

FIG. 6 shows another process for making the containers 10 and 80 shown in FIGS. 1 and 5, respectively, according to another embodiment of the invention. This process is similar to the process shown in FIG. 2 and discussed in conjunction with FIG. 2, except that after the hole 64 (FIGS. 3 and 4) is formed in the outer wall 14, but before the enamel coating is applied to the inner and outer walls 12 and 14, respectively, the hole 64, at step 90 is temporarily plugged to temporarily seal the second cavity from the outside ambient environment. This ensures that liquid enamel will not be deposited in the hole 64 or into the second cavity 46. Then, after the enamel coating has been applied, the second cavity 46, at step 92, is exposed to the ambient environment.

The second cavity may be temporarily sealed using any desired technique. For example, in this and other embodiments a plug (not shown) that is elastically deformable and sized to fit into a hole 64 in the outer wall 14 is inserted into the hole 64. While inserted into the hole 64, the plug prevents air and, more importantly, enamel coating from flowing through the hole 64 and into the second cavity 46. Then, after the enamel coating has been applied to the container 10 and/or 80, the plug may be removed to expose the second cavity 46 in preparation for heating the enamel coating to fix the enamel coating to the container 10 and/or 80. In other embodiments, the second cavity 46 may be temporarily sealed by releasably coupling a cover (not shown) to the region of the outer wall 14 and/or base 60 that includes the hole 64. The cover may extend as far over the second wall 14 as desired to seal the hole and provide a handle that one can use to hold and manipulate the container 10 while applying the enamel coating 16. Each of the plug and the cover can be re-used in similar processes for making additional containers 10. In still other embodiments, the plug may not be releasably inserted into the hole 64, and instead of withdrawing the plug before heating the enamel coating 16, the second cavity 46 may be exposed by forming another hole through the outer wall 14 and/or base 60.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for making a container, the method comprising:
    forming a first cavity of a container by shaping an inner wall so that a first surface of the inner wall defines the first cavity;
    forming a second cavity of the container by shaping an outer wall so that a third surface of the outer wall surrounds a second surface of the inner wall such that together the third and second surfaces define the second cavity;
    connecting the inner and outer walls together;
    forming a hole through the outer wall to expose the second cavity to the outside ambient environment;
    applying an enamel coating on at least one of the following: the first surface of the inner wall and a fourth surface of the outer wall that is exposed to the outside ambient environment, while preventing the enamel coating from being deposited in the hole;
    wherein before applying the enamel coating, temporarily sealing the second cavity to isolate the second cavity from the ambient environment outside of the outer wall;
    heating the container to glaze the enamel coating and fix the coating to the one or more surfaces;
    after the enamel is glazed, removing air from the second cavity; and
    while the air is removed from the second cavity, sealing the second cavity so that the pressure inside the second cavity is less than the pressure in the outside ambient environment.

2. The method of claim 1 wherein forming the inner and outer walls includes forming the walls from a single, continuous piece of material.

3. The method of claim 1 wherein connecting the inner and outer walls together includes the outer wall extending from a region of the inner wall that defines an opening to the first cavity.

4. The method of claim 1 wherein applying an enamel coating includes dipping the first surface of the inner wall and/or the fourth surface of the outer wall into a bath of liquid enamel.

5. The method of claim 1 wherein applying the enamel coating includes painting with a brush the enamel coating onto the first surface of the inner wall and/or the fourth surface of the outer wall.

6. The method of claim 1 wherein heating the enamel to glaze the enamel includes heating the enamel to a temperature of about 800° C.

7. The method of claim 1 wherein removing air from the second cavity includes heating the second cavity to a temperature of about 400° C.

8. The method of claim 1 wherein sealing the second cavity after removing air from the second cavity includes melting a plug of material disposed in a hole of the outer wall.

9. The method of claim 1 wherein temporarily sealing the second cavity includes inserting a plug into a hole through the outer wall.

10. The method of claim 1 wherein temporarily sealing the second cavity includes covering a hole through the outer wall.

* * * * *